United States Patent
Welscher (10) Patent No.: US 11,199,726 B2
(45) Date of Patent: Dec. 14, 2021

(54) SPECTACLE LENS, FAMILY OF SPECTACLE LENSES, METHOD FOR DESIGNING A FAMILY OF SPECTACLE LENSES AND METHOD FOR PRODUCING A SPECTACLE LENS

(71) Applicant: Carl Zeiss Vision International GmbH, Aalen (DE)

(72) Inventor: Markus Welscher, Rainau (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/319,385

(22) Filed: May 13, 2021

(65) Prior Publication Data

US 2021/0263341 A1    Aug. 26, 2021

Related U.S. Application Data

(63) Continuation of application No. PCT/EP2019/082991, filed on Nov. 28, 2019.

(30) Foreign Application Priority Data

Dec. 3, 2018   (EP) ..................... 18209854

(51) Int. Cl.
G02C 7/06    (2006.01)

(52) U.S. Cl.
CPC ............. G02C 7/065 (2013.01); G02C 7/068 (2013.01)

(58) Field of Classification Search
CPC ......... G02C 7/065; G02C 7/068; G02C 7/028
See application file for complete search history.

(56) References Cited

U.S. PATENT DOCUMENTS 3,960,442 A   6/1976  Davis et al.
6,089,713 A   7/2000  Hof et al.
(Continued)

FOREIGN PATENT DOCUMENTS

DE   10020914 A1   10/2001
EP     857993 B2    8/2013
(Continued)

OTHER PUBLICATIONS

Ophthalmic optics—Spectacle lenses—Vocabulary (ISO 13666:2012); German and English version EN ISO 13666:2012, Oct. 2013.
(Continued)

*Primary Examiner* — Tuyen Tra
(74) *Attorney, Agent, or Firm* — Thrive IP®; Georg Hasselmann (57) ABSTRACT

A family of spectacle lenses is provided in which each spectacle lens is configured to achieve a specified prescriptive spherical power from among a number of prescriptive spherical powers and a specified prescriptive astigmatic power from among a number of prescriptive astigmatic powers. Each spectacle lens has a specified rotationally symmetrical spectacle-lens front face, a specified atoric spectacle-lens rear face, and in at least one principal section, such a deviation in the curvature from the circular form that, for a value for the distance between the vertex of the spectacle lens rear face and the pivot point of the eye, which lies in a range between 15 and 40 mm, at any point in a spectacle lens region within a radius of 25 mm about the geometrical center of the spectacle lens, an upper limit of the total deviation of the power is not exceeded.

13 Claims, 4 Drawing Sheets

| Range of spherical powers (D) | Surface refractive power of the rear spectacle lens surface in the principal sections of the rear spectacle lens surface | | | | | | | | Zyl |
|---|---|---|---|---|---|---|---|---|---|
| | 0.00 | -0.25 | -0.50 | -0.75 | -1.00 | -1.25 | -1.50 | -1.75 | -2.00 | |
| A  0.00 to -1.00 | 3.17 | 3.17 / 3.37 | 3.17 / 3.57 | 3.17 / 3.76 | 3.17 / 3.96 | 3.17 / 4.16 | 3.17 / 4.36 | 3.17 / 4.56 | 3.17 / 4.75 | a |
| B  -1.25 to -2.00 | 3.57 | 3.57 / 3.76 | 3.57 / 3.96 | 3.57 / 4.16 | 3.57 / 4.36 | 3.57 / 4.56 | 3.57 / 4.75 | 3.57 / 4.95 | 3.57 / 5.15 | b |
| C  -2.25 to -3.00 | 3.96 | 3.96 / 4.16 | 3.96 / 4.36 | 3.96 / 4.56 | 3.96 / 4.75 | 3.96 / 4.95 | 3.96 / 5.15 | 3.96 / 5.35 | 3.96 / 5.55 | c |
| D  -3.25 to -4.00 | 4.36 | 4.36 / 4.56 | 4.36 / 4.75 | 4.36 / 4.95 | 4.36 / 5.15 | 4.36 / 5.35 | 4.36 / 5.55 | 4.36 / 5.74 | 4.36 / 5.94 | d |
| E  -4.25 to -5.00 | 4.75 | 4.75 / 4.95 | 4.75 / 5.15 | 4.75 / 5.35 | 4.75 / 5.55 | 4.75 / 5.74 | 4.75 / 5.94 | 4.75 / 6.14 | 4.75 / 6.34 | e |
| F  -5.25 to -6.00 | 5.15 | 5.15 / 5.35 | 5.15 / 5.55 | 5.15 / 5.74 | 5.15 / 5.94 | 5.15 / 6.14 | 5.15 / 6.34 | 5.15 / 6.54 | 5.15 / 6.73 | f |

(56) References Cited

U.S. PATENT DOCUMENTS

| | | | |
|---|---|---|---|
| 6,260,967 B1* | 7/2001 | Edwards | G02C 7/068 |
| | | | 351/159.42 |
| 6,305,800 B1 | 10/2001 | Miller et al. | |
| 7,111,937 B2* | 9/2006 | Landgrave | G02C 7/02 |
| | | | 351/159.22 |
| 10,928,655 B2 | 2/2021 | Spratt | |
| 2002/0008846 A1 | 1/2002 | Kelch et al. | |
| 2006/0132708 A1 | 6/2006 | Landgrave et al. | |
| 2010/0149492 A1 | 6/2010 | Allione et al. | |

FOREIGN PATENT DOCUMENTS

| | | |
|---|---|---|
| EP | 2821840 A1 | 1/2015 |
| WO | 2018071835 A1 | 4/2018 |

OTHER PUBLICATIONS

International Search Report issued in PCT/EP2019/082991, to which this application claims priority, dated Mar. 25, 2020, and English-language translation thereof.

Written Opinion issued in PCT/EP2019/082991, to which this application claims priority, dated Jun. 11, 2020.

International Preliminary Examination Report issued in PCT/EP2019/082991, to which this application claims priority, dated Mar. 31, 2021, and English-language translation thereof.

* cited by examiner

FIG. 1

| | Spherical power (D) | Surface refractive power of the front spectacle lens surface (D) |
|---|---|---|
| A | 0.00 | -3.16 |
| A | -0.25 | -2.97 |
| A | -0.50 | -2.77 |
| A | -0.75 | -2.59 |
| A | -1.00 | -2.38 |
| B | -1.25 | -2.58 |
| B | -1.50 | -2.37 |
| B | -1.75 | -2.19 |
| B | -2.00 | -2.01 |
| C | -2.25 | -2.19 |
| C | -2.50 | -2.01 |
| C | -2.75 | -1.81 |
| C | -3.00 | -1.59 |
| D | -3.25 | -1.79 |
| D | -3.50 | -1.61 |
| D | -3.75 | -1.41 |
| D | -4.00 | -1.20 |
| E | -4.25 | -1.38 |
| E | -4.50 | -1.20 |
| E | -4.75 | -1.01 |
| E | -5.00 | -0.81 |
| F | -5.25 | -1.00 |
| F | -5.50 | -0.82 |
| F | -5.75 | -0.60 |
| F | -6.00 | -0.42 |

FIG. 2

| Range of spherical powers (D) | Surface refractive power of the rear spectacle lens surface in the principal sections of the rear spectacle lens surface | | | | | | | | Zyl |
|---|---|---|---|---|---|---|---|---|---|
| | 0.00 | -0.25 | -0.50 | -0.75 | -1.00 | -1.25 | -1.50 | -1.75 | -2.00 |
| A 0.00 to -1.00 | 3.17 | 3.17 / 3.37 | 3.17 / 3.57 | 3.17 / 3.76 | 3.17 / 3.96 | 3.17 / 4.16 | 3.17 / 4.36 | 3.17 / 4.56 | 3.17 / 4.75 | a
| B -1.25 to -2.00 | 3.57 | 3.57 / 3.76 | 3.57 / 3.96 | 3.57 / 4.16 | 3.57 / 4.36 | 3.57 / 4.56 | 3.57 / 4.75 | 3.57 / 4.95 | 3.57 / 5.15 | b
| C -2.25 to -3.00 | 3.96 | 3.96 / 4.16 | 3.96 / 4.36 | 3.96 / 4.56 | 3.96 / 4.75 | 3.96 / 4.95 | 3.96 / 5.15 | 3.96 / 5.35 | 3.96 / 5.55 | c
| D -3.25 to -4.00 | 4.36 | 4.36 / 4.56 | 4.36 / 4.75 | 4.36 / 4.95 | 4.36 / 5.15 | 4.36 / 5.35 | 4.36 / 5.55 | 4.36 / 5.74 | 4.36 / 5.94 | d
| E -4.25 to -5.00 | 4.75 | 4.75 / 4.95 | 4.75 / 5.15 | 4.75 / 5.35 | 4.75 / 5.55 | 4.75 / 5.74 | 4.75 / 5.94 | 4.75 / 6.14 | 4.75 / 6.34 | e
| F -5.25 to -6.00 | 5.15 | 5.15 / 5.35 | 5.15 / 5.55 | 5.15 / 5.74 | 5.15 / 5.94 | 5.15 / 6.14 | 5.15 / 6.34 | 5.15 / 6.54 | 5.15 / 6.73 | f

SPECTACLE LENS, FAMILY OF SPECTACLE LENSES, METHOD FOR DESIGNING A FAMILY OF SPECTACLE LENSES AND METHOD FOR PRODUCING A SPECTACLE LENS

CROSS REFERENCE TO RELATED APPLICATIONS

This application is a continuation application of international patent application PCT/EP2019/082991, filed Nov. 28, 2019, designating the United States and claiming priority from European application EP 18209854.1, filed Dec. 3, 2018, and the entire content of both applications is incorporated herein by reference.

TECHNICAL FIELD

The present disclosure relates to a spectacle lens for achieving a prescription-based spherical power and a prescription-based astigmatic power, which has a rotationally symmetrical front spectacle lens surface and an atoric rear spectacle lens surface. In addition, the disclosure relates to a family of such spectacle lenses. The disclosure also relates to a computer-implemented method for designing such a family of spectacle lenses and to a non-volatile computer-readable storage medium with instructions stored thereon for performing the method on a computer. Finally, the disclosure also relates to a method for producing a spectacle lens.

BACKGROUND

Spectacle lenses, in particular also single-vision spectacle lenses, i.e., such spectacle lenses with a design that only has a dioptric power, are provided with aspheres in order to reduce image errors or to be able to produce flatter spectacle lenses without increasing the image errors of the spectacle lens. An example of a spectacle lens provided with an asphere is described in EP 2 821 840 A1. In addition, US 2006/0132708 A1 describes a spectacle lens with an atoric surface.

Spectacle lenses can have different image error distributions over the spectacle lens surface for the same prescription-based effect, with an image error distribution describing the deviation of the prescription-based effect of the spectacle lens from the effect actually achieved with it at different points of the spectacle lens distributed over the spectacle lens, and with it being possible for different image error distributions to be considered to be optimum, depending on the application area of the spectacle lens. For example, the image error distribution considered to be optimum may depend on whether the spherical image errors or the astigmatic image errors are considered to be disturbing. To reduce the image errors in the image error distribution, an aspherization of a spectacle lens surface takes place in order to achieve as well as possible the image error distribution considered to be optimum for the respective prescription-based effect. For aspherical FSV spectacle lenses (FSV spectacle lens: finished single-vision spectacle lens), an aspherical front mold shell and a toric rear mold shell are typically used to produce the spectacle lenses, with the aid of which a finished product is cast. With this type of production, the aspherical surface is then located on the front spectacle lens surface and the surface provided with the torus forms the rear surface, with which the prescription-based effect is realized. In other words, the aspherization of the front surface is used to optimize the image error distribution, and the rear spectacle lens surface is used to provide the prescription-based effect. In this production method, the aspherical surface for the front spectacle lens surface is usually optimized for the prescription-based spherical power, in order then to be used for a number of prescription-based spherical and astigmatic powers. To produce a spectacle lens of an FSV spectacle lens family, a front mold shell and a rear mold shell are in each case typically selected from a set of front mold shells or rear mold shells and combined. For example, a set of rear mold shells may in each case comprise one spherical and a number of toric rear mold shells, for example up to a cylinder value of −2 diopters, which can in each case be combined with a number of aspherical front mold shells.

A set of rear mold shells is used for typically four spherical prescriptions (that is for example from Sph −1.25 D to Sph −2.0 D) mainly because the shrinkage is similar over such a range. Beyond the range of 4 spherical prescriptions, another correction factor must then be provided for the shrinkage. Since the aspherical surfaces of the front mold shells are only optimized for a spherical prescription effect, the intended optical correction to be achieved with the asphere is unobtained more and more, especially with increasing prescription-based astigmatic power. This is because, if the aspherical surface is optimized only for spherical powers and is then used for many prescription-based astigmatic powers, the resulting spectacle lenses have the optical correction intended when optimizing the aspherical surface at most in one principal section. This means that, at least in the case of a prescription-based astigmatic power, the asphere in one of the principal sections is not optimized for the required prescription-based effect. If one wanted to achieve an improvement in the correction to be achieved with the aspherical surface, then the number of optimized aspherical surfaces, and thus the number of front mold shells, would have to be increased significantly. In addition, the aspherization of the front spectacle lens surface would also have to be adapted to the prescription-based astigmatic power, which, in addition to increasing the number of front surface mold shells for the production of a family of spectacle lenses, also means that the aspherical front spectacle lens surfaces are no longer rotationally symmetrical, so that, in the production of a spectacle lens, the axial positions of the spectacle lens surfaces defined by the front surface mold shells and rear surface mold shells would have to be made to coincide. This would complicate the production method considerably.

WO 2018/071835 A1 discloses a family of spectacle lenses in which the front spectacle lens surfaces are spherical and the rear spectacle lens surfaces are aspherically atoric or formed as free-form surfaces. It is considered to be an advantage of this configuration to use for the front spectacle lens surface that basic curve which has the greatest curvature and which still makes it possible to produce the rear surface with existing means. The strongly curved basic curve also makes it possible to minimize image error distributions over the spectacle lens. According to the teaching of WO 2018/071835 A1, in particular spectacle lenses with the same surface refractive power of the front spectacle lens surface and different dioptric powers or with the same surface refractive power of the rear spectacle lens surface and different dioptric powers may be present.

SUMMARY

It is an object of the present disclosure to provide a spectacle lens for a family of spectacle lenses, a family of spectacle lenses, a method for designing a family of spectacle lenses and a method for producing a spectacle lens which make it possible to realize the spectacle lenses of the family of spectacle lens with a small number of specified front spectacle lens surfaces and rear spectacle lens surfaces and nevertheless be able to achieve the optical image error distribution well, even in the case of an increasing prescription-based astigmatic power.

This object is achieved by a spectacle lens having a rotationally symmetrical front spectacle lens surface and a real atoric rear spectacle lens surface, a family of spectacle lenses in which there is in each case a spectacle lens for achieving a specific prescription-based spherical power from a number of prescription-based spherical powers and a specific prescription-based astigmatic power from a number of prescription-based astigmatic powers, a computer-implemented method for designing a family of spectacle lenses a number of prescription-based spherical powers and a number of prescription-based astigmatic powers are specified, a non-volatile computer-readable storage medium with instructions stored thereon for designing a family of spectacle lenses, and a method for producing a spectacle lens in which a prescription-based spherical power and a prescription-based astigmatic power are specified.

A spectacle lens according to the disclosure for achieving a prescription-based spherical power, which can also be zero, and a prescription-based astigmatic power, which can also be zero, has a rotationally symmetrical front spectacle lens surface, i.e., a spherical or rotationally symmetrical aspherical front spectacle lens surface, and an atoric rear spectacle lens surface. An atoric rear spectacle lens surface is a rear spectacle lens surface which has two mutually perpendicular principal sections of different curvature and in which the cross section in at least one of the principal sections is not circular, the principal sections being those meridian planes of a surface with the maximum or minimum measured curvature of this surface. A meridian plane is a plane that contains the center of curvature of the surface.

In the spectacle lens according to the disclosure, the atoric rear spectacle lens surface has in at least one principal section such a deviation of the curvature from the circular shape that, with a value for the distance between the vertex of the rear spectacle lens surface and the center of rotation of the eye that lies in a range which extends from 15 mm to 40 mm, and can in particular extend from 20 to 30 mm, at every point of a region of the spectacle lens situated within a radius of 25 mm around the geometrical center of the spectacle lens an upper limit of the total deviation RMS=Sqrt (SphAbw$^2$+(astAbw/2)$^2$) of the effect is not exceeded, where the upper limit of the total deviation is given by 0.25 D−MIN[(0.05·Sph−0.1·|Zyl|);0]

and where

Sph denotes the "sphere" value of the prescription-based spherical power, Zyl denotes the "cylinder" value of the prescription-based astigmatic power, which can assume the value zero or a negative value, in particular a value from the interval [0 D, −3 D],

|Zyl| denotes the absolute value of the "cylinder" value, sphAbw denotes the deviation of the prescription-based spherical power of the spectacle lens from the spherical power actually achieved with it, astAbw denotes the deviation of the prescription-based astigmatic power of the spectacle lens from the astigmatic power actually achieved with it and MIN denotes the minimum function.

In other words, the total deviation in the entire region of the spectacle lens situated within a radius of 25 mm around the geometrical center of the spectacle lens is RMS≤0.25 D−MIN[(0.05·Sph−0.1·|Zyl|);0]

and typically even

RMS≤0.18 D−MIN[(0.045·Sph−0.09·|Zyl|);0].

The total deviation RMS is the root mean square value (RMS).

Due to the formation according to the disclosure of the rear spectacle lens surface as an atoric rear spectacle lens surface, a matching asphere can be made available for the principal sections of the spectacle lens for each astigmatic power, so that the desired correction of the image errors can also take place in both principal sections. If a set of atoric rear spectacle lens surfaces is respectively used for a specific range of spherical powers, i.e., is combined with a number of spherical or rotationally symmetrical aspherical front spectacle lens surfaces, an entire family of spectacle lenses with consistently low image errors and a relatively small number of front spectacle lens surfaces and rear spectacle lens surfaces can be realized. In particular, no more front spectacle lens surfaces and rear spectacle lens surfaces are necessary than if the image error distribution is optimized by aspherization of the front spectacle lens surfaces, as was described at the beginning. Compared to the aspherization of the front spectacle lens surfaces to optimize the image error distribution when correcting a prescription-based astigmatic power, optimizing the image error distribution on the basis of the atoric rear spectacle lens surface offers the advantage of reducing the image errors and the advantage that no preferred orientation between the rear spectacle lens surface and the front spectacle lens surface has to be maintained.

If in the case of an atoric surface the radii of curvature and the non-circular cross sections approximate to one another in both principal sections, in the limiting case of the same radii of curvature and the same non-circular cross sections in both principal sections an aspherical surface is obtained. In this sense, an aspherical surface represents a special form of the atoric surface and, within the scope of the present disclosure, should be included in the term atoric surface. A surface in which the radii of curvature differ from one another in the two principal sections and in which the cross section deviates from the circular shape in at least one of the principal sections is referred to in the context of the present description as a real atoric surface. The spectacle lens according to the disclosure can have as the atoric rear spectacle lens surface in particular a real atoric rear spectacle lens surface, i.e., a rear spectacle lens surface which is a real atoric surface.

In an exemplary embodiment of the disclosure, values for sphAbw that are less than zero are set equal to zero in the equation RMS=Sqrt (SphAbw$^2$+(astAbw/2)$^2$) for the total deviation. Deviations of the prescription-based spherical power of the spectacle lens from the spherical power actually achieved with it which are smaller than zero can be assumed to be zero, because negative deviations of the prescription-based spherical power of the spectacle lens from the spherical power actually achieved with it can be accommodated by the spectacle wearer, and thus do not contribute to the image error of the spectacle lens, if they do not exceed a certain amount. In this configuration of the spectacle lens, therefore, only those values for the deviation of the prescription-based spherical power of the spectacle lens from the spherical power actually achieved with it that actually contribute to the image error are taken into account. In the case of a family of spectacle lenses, negative deviations of the prescription-based spherical power of the spectacle lens from the spherical power actually achieved with it are only achieved, if at all, in a size in the range of [0; −1 D].

The spectacle lenses can typically be optimized for the correction of distant ametropia. They are then usually not worn by people with advanced presbyopia, so that it can be assumed that the people wearing the glasses can accommodate such low values (for comparison: standard reading distance corresponds to −2.63 D). All RMS values of the total deviation and ametropias above are therefore also related to the distance (infinite) in the configuration for the correction of distant ametropia.

The aforementioned advantages of the spectacle lens according to the disclosure come into effect in particular in the case of single-vision spectacle lenses, since these are typically cast using front mold shells for the front spectacle lens surface and rear mold shells for the rear spectacle lens surface. The disclosure makes it possible to keep down the number of front mold shells and rear mold shells to be kept in stock for a family of single-vision spectacle lenses.

In a family of spectacle lenses according to the disclosure, there is in each case a spectacle lens for achieving a specific prescription-based spherical power, which can also be zero, from a number of prescription-based spherical powers and a specific prescription-based astigmatic power, which can also be zero, from a number of prescription-based astigmatic powers. Each spectacle lens has a specific rotationally symmetrical front spectacle lens surface, that is to say a specific spherical or rotationally symmetrical aspherical front spectacle lens surface, and a specific atoric rear spectacle lens surface.

According to the disclosure, in the case of each spectacle lens of the family, but at least in the case of each spectacle lens of the family of spectacle lenses that has a real atoric rear spectacle lens surface, there is such a deviation of the curvature from the circular shape in at least one principal section that, with a value for the distance between the vertex of the rear spectacle lens surface and the center of rotation of the eye that lies in a range which extends from 15 mm to 40 mm, and can in particular extend from 20 to 30 mm, at every point of a region of the spectacle lens situated within a radius of 25 mm around the geometrical center of the spectacle lens an upper limit of the total deviation $RMS=Sqrt\ (SphAbw^2+(astAbw/2)^2)$ of the effect is not exceeded, where the upper limit of the total deviation is given by $$0.25\ D-MIN[(0.05 \cdot Sph-0.1 \cdot |Zyl|);0]$$

and where
Sph denotes the "sphere" value of the prescription-based spherical power,
Zyl denotes the "cylinder" value of the prescription-based astigmatic power, which can assume the value zero or a negative value, in particular a value from the interval [0 D, −3 D],
|Zyl| denotes the absolute value of the "cylinder" value,
sphAbw denotes the deviation of the prescription-based spherical power of the spectacle lens from the spherical power actually achieved with it,
astAbw denotes the deviation of the prescription-based astigmatic power of the spectacle lens from the astigmatic power actually achieved with it, and
MIN denotes the minimum function.

In other words, the total deviation in the entire region of the spectacle lens situated within the radius of 25 mm around the geometrical center of the spectacle lens is $$RMS \leq 0.25\ D-MIN[(0.05 \cdot Sph-0.1 \cdot |Zyl|);0]$$

and typically even $$RMS \leq 0.18\ D-MIN[(0.045 \cdot Sph-0.09 \cdot |Zyl|);0].$$

In the family of spectacle lenses, values for sphAbw that are less than zero are set equal to zero in the equation $RMS=Sqrt\ (SphAbw^2+(astAbw/2)^2)$, as has already been explained with reference to the spectacle lens according to the disclosure.

As has already been described with reference to the spectacle lens according to the disclosure, the present disclosure makes it possible to produce the entire family of spectacle lenses using relatively fewer front spectacle lens surfaces and rear spectacle lens surfaces. This makes it possible in the case of single-vision spectacle lenses cast with the aid of front mold shells and rear mold shells to keep down the number of mold shells to be kept in stock because the family of spectacle lenses can comprise spectacle lenses which have in each case the same atoric rear spectacle lens surface but respectively different spherical or rotationally symmetrical aspherical front spectacle lens surfaces. On the other hand, a spherical or rotationally symmetrical aspherical front spectacle lens surface can in each case also be combined with a number of atoric rear spectacle lens surfaces. In particular, in the family of spectacle lenses there may be groups of rotationally symmetrical front spectacle lens surfaces, each group of rotationally symmetrical front spectacle lens surfaces containing a number of different rotationally symmetrical front spectacle lens surfaces, groups of atoric rear spectacle lens surfaces, each group of atoric rear spectacle lens surfaces containing a number of atoric rear spectacle lens surfaces and each group of atoric rear spectacle lens surfaces being assigned to a group of rotationally symmetrical front spectacle lens surfaces, and each combination of an atoric rear spectacle lens surface from a group of atoric rear spectacle lens surfaces with a rotationally symmetrical front spectacle lens surface from the assigned group of rotationally symmetrical front spectacle lens surfaces represents a spectacle lens of the family of spectacle lenses.

This assignment in groups can allow the front spectacle lens surfaces and rear spectacle lens surfaces to be sorted, which makes it possible for the atoric rear spectacle lens surfaces to be assigned quickly to suitable rotationally symmetrical front spectacle lens surfaces, i.e., to suitable spherical or rotationally symmetrical aspherical front spectacle lens surfaces.

The family of spectacle lenses may in particular be a family of single-vision spectacle lenses. In the case of single-vision spectacle lenses, the advantages of the family of spectacle lenses according to the disclosure particularly come into effect, since the single-vision spectacle lenses are cast by casting using a number of front surface mold shells, for shaping the front spectacle lens surfaces, and rear surface mold shells, for shaping the rear spectacle lens surfaces, to be combined with one another. In the family of spectacle lenses according to the disclosure, the number of these mold shells can be kept down. If, in addition, the described groups of rotationally symmetrical front spectacle lens surfaces, the described groups of atoric rear spectacle lens surfaces and the described assignment of the groups of atoric rear spectacle lens surfaces to the groups of rotationally symmetrical front spectacle lens surfaces are available, those front shaping surfaces and rear shaping surfaces that are to be combined with one another can also be quickly found.

In the computer-implemented method according to the disclosure for designing a family of spectacle lenses, a number of prescription-based spherical powers and a number of prescription-based astigmatic powers are specified, and, for each combination of a specific spherical power from the number of prescription-based spherical powers with a specific astigmatic power from the number of prescription-based astigmatic powers, in each case a spectacle lens with a rotationally symmetrical front spectacle lens surface, i.e., with a spherical or rotationally symmetrical aspherical front spectacle lens surface, and an atoric rear spectacle lens surface is determined. According to the disclosure, for each of the atoric rear spectacle lens surfaces, the deviation of the curvature of the respective atoric rear spectacle lens surfaces from the circular shape in the at least one principal section is determined for a value of the distance between the vertex of the rear spectacle lens surface and the center of rotation of the eye that lies in a range which extends from 15 mm to 40 mm, and can in particular extend from 20 mm to 30 mm, in such a way that, with a distance between the vertex of the rear spectacle lens surface and the center of rotation of the eye corresponding to the value, at every point of a region of the spectacle lens situated within a radius of 25 mm around the geometrical center of the spectacle lens an upper limit of the total deviation RMS=Sqrt (SphAbw$^2$+(astAbw/2)$^2$) of the effect is not exceeded, where the upper limit of the total deviation is given by $$0.25 \text{ D−MIN}[(0.05 \cdot Sph - 0.1 \cdot |Zyl|); 0]$$

and where
Sph denotes the "sphere" value of the prescription-based spherical power,
|Zyl| denotes the absolute value of the "cylinder" value,
Zyl denotes the "cylinder" value of the prescription-based astigmatic power, which can assume the value zero or a negative value, in particular a value from the interval [0 D, −3 D],
sphAbw denotes the deviation of the prescription-based spherical power of the spectacle lens from the spherical power actually achieved with it,
astAbw denotes the deviation of the prescription-based astigmatic power of the spectacle lens from the astigmatic power actually achieved with it, and
MIN denotes the minimum function.

In other words, the total deviation in the entire region of the spectacle lens situated within the radius of 25 mm around the geometrical center of the spectacle lens is $$RMS \leq 0.25 \text{ D−MIN}[(0.05 \cdot Sph - 0.1 \cdot |Zyl|); 0]$$

and typically even $$RMS \leq 0.18 \text{ D−MIN}[(0.045 \cdot Sph - 0.09 \cdot |Zyl|); 0].$$

The spectacle lenses to be designed with the computer-implemented method according to the disclosure for designing a family of spectacle lenses may be in particular spectacle lenses which have real atoric rear spectacle lens surfaces as atoric rear spectacle lens surfaces.

In the computer-implemented method according to the disclosure, values for sphAbw that are less than zero can be set equal to zero in the equation RMS=Sqrt (SphAbw$^2$+(astAbw/2)$^2$), as has already been explained with reference to the spectacle lens according to the disclosure.

The computer-implemented method according to the disclosure makes it possible to design a family of spectacle lenses according to the disclosure, and thus a family of spectacle lenses which realizes the advantages according to the disclosure described above.

A non-volatile computer-readable storage medium according to the disclosure has instructions stored thereon for designing a family of spectacle lenses, the instructions, when executed on a computer, causing the computer to:
specify or record a number of prescription-based spherical powers and a number of prescription-based astigmatic powers and
determine for each combination of a specific spherical power from the number of prescription-based spherical powers with a specific astigmatic power from the number of prescription-based astigmatic powers in each case a spectacle lens with a rotationally symmetrical front spectacle lens surface, i.e., a spherical or rotationally symmetrical aspherical front spectacle lens surface, and an atoric rear spectacle lens surface.

According to the disclosure, the storage medium also comprises instructions stored thereon, which, when executed on a computer, cause the computer to determine for each of the atoric rear spectacle lens surfaces the deviation of the curvature of the respective atoric rear spectacle lens surface from the circular shape in the at least one principal section for a value of the distance between the vertex of the rear spectacle lens surface and the center of rotation of the eye that lies in a range which extends from 15 mm to 40 mm, and can in particular extend from 20 mm to 30 mm, in such a way that, with a distance between the vertex of the rear spectacle lens surface and the center of rotation of the eye corresponding to the value, at every point of a region of the spectacle lens situated within a radius of 25 mm around the geometrical center of the spectacle lens an upper limit of the total deviation RMS=Sqrt (SphAbw$^2$+(astAbw/2)$^2$) of the effect is not exceeded, where the upper limit of the total deviation is given by $$0.25 \text{ D−MIN}[(0.05 \cdot Sph - 0.1 \cdot |Zyl|); 0]$$

and where
Sph denotes the "sphere" value of the prescription-based spherical power,
Zyl denotes the "cylinder" value of the prescription-based astigmatic power, which can assume the value zero or a negative value, in particular a value from the interval [0 D, −3 D],
|Zyl| denotes the absolute value of the "cylinder" value,
sphAbw denotes the deviation of the prescription-based spherical power of the spectacle lens from the spherical power actually achieved with it,
astAbw denotes the deviation of the prescription-based astigmatic power of the spectacle lens from the astigmatic power actually achieved with it, and
MIN denotes the minimum function.

In other words, the total deviation in the entire region of the spectacle lens situated within the radius of 25 mm around the geometrical center of the spectacle lens is $$RMS \leq 0.25 \text{ D−MIN}[(0.05 \cdot Sph - 0.1 \cdot |Zyl|); 0]$$

and typically even $$RMS \leq 0.18 \text{ D−MIN}[(0.045 \cdot Sph - 0.09 \cdot |Zyl|); 0].$$

The instructions stored on the storage medium can in particular be designed to cause the computer to design such spectacle lenses from a family of spectacle lenses which have real atoric rear spectacle lens surfaces as atoric rear spectacle lens surfaces.

In the non-volatile computer-readable storage medium according to the disclosure, values for sphAbw that are less than zero can be set equal to zero in the equation RMS=Sqrt (SphAbw$^2$+(astAbw/2)$^2$), as has already been explained with reference to the spectacle lens according to the disclosure.

The non-volatile computer-readable storage medium according to the disclosure makes it possible for the computer-implemented method for designing a family of spectacle lenses to be performed on a computer and thus a family of spectacle lenses with the advantages described above to be realized.

In the method according to the disclosure for producing a spectacle lens, a prescription-based spherical power and a prescription-based astigmatic power are specified. For the combination of the specified prescription-based spherical power and the specified prescription-based astigmatic power, a rotationally symmetrical front spectacle lens surface, i.e., a spherical or rotationally symmetrical aspherical front spectacle lens surface, from a number of different specified rotationally symmetrical front spectacle lens surfaces and an atoric rear spectacle lens surface from a number of different specified atoric rear spectacle lens surfaces are selected. The spectacle lens is then shaped with the selected rotationally symmetrical front spectacle lens surface and the selected atoric rear spectacle lens surface.

According to the disclosure, in the case of each of the atoric rear spectacle lens surfaces from the number of different specified atoric rear spectacle lens surfaces, the deviation of the curvature of the respective atoric rear spectacle lens surface from the circular shape in at least one principal section is formed in such a way that, with a value for the distance between the vertex of the rear spectacle lens surface and the center of rotation of the eye that lies in a range which extends from 15 mm to 40 mm, and can in particular extend from 20 to 30 mm, at every point of a region of the spectacle lens situated within a radius of 25 mm around the geometrical center of the spectacle lens an upper limit of the total deviation RMS=Sqrt (SphAbw$^2$+ (astAbw/2)$^2$) of the effect is not exceeded, where the upper limit of the total deviation is given by $$0.25 \, D\text{-}MIN[(0.05 \cdot Sph - 0.1 \cdot |Zyl|); 0]$$

and where

Sph denotes the "sphere" value of the prescription-based spherical power,

Zyl denotes the "cylinder" value of the prescription-based astigmatic power, which can assume the value zero or a negative value, in particular a value from the interval [0 D, −3 D],

|Zyl| denotes the absolute value of the "cylinder" value, sphAbw denotes the deviation of the prescription-based spherical power of the spectacle lens from the spherical power actually achieved with it, astAbw denotes the deviation of the prescription-based astigmatic power of the spectacle lens from the astigmatic power actually achieved with it, and MIN denotes the minimum function.

In other words, the total deviation in the entire region of the spectacle lens situated within the radius of 25 mm around the geometrical center of the spectacle lens is $$RMS \leq 0.25 \, D\text{-}MIN[(0.05 \cdot Sph - 0.1 \cdot |Zyl|); 0]$$

and typically even $$RMS \leq 0.18 \, D\text{-}MIN[(0.045 \cdot Sph - 0.09 \cdot |Zyl|); 0].$$

With the method according to the disclosure for producing a spectacle lens, in particular those spectacle lenses which have a real atoric rear spectacle lens surface as the atoric rear spectacle lens surface can be produced.

In the method according to the disclosure for producing a spectacle lens, values for sphAbw that are less than zero can be set equal to zero in the equation RMS=Sqrt (SphAbw$^2$+ (astAbw/2)$^2$), as has already been explained with reference to the spectacle lens according to the disclosure.

The method according to the disclosure makes it possible to produce a spectacle lens according to the disclosure and thus makes it possible to produce a spectacle lens which has the properties and advantages described with reference to the spectacle lens according to the disclosure.

In a first variant of the method according to the disclosure for producing a spectacle lens, at least one of the spectacle lens surfaces is formed by casting. In particular, the entire shaping of the spectacle lens take place by casting. In this variant, the front spectacle lens surfaces from the number of different specified rotationally symmetrical front spectacle lens surfaces are provided in each case by a front surface mold shell with a shaping surface for shaping the respective front spectacle lens surface. Additionally or alternatively, the rear spectacle lens surfaces from the number of different specified atoric rear spectacle lens surfaces are provided in each case by a rear surface mold shell with a shaping surface for shaping the respective rear spectacle lens surface. The forming of the spectacle lens by casting is a low-cost production method for spectacle lenses from an organic glass material that can be carried out with little expenditure of time.

In a second variant of the method according to the disclosure for producing a spectacle lens, at least one of the spectacle lens surfaces is shaped by grinding. In particular, the entire shaping of the spectacle lens can take place by grinding. The front spectacle lens surfaces from the number of different specified rotationally symmetrical front spectacle lens surfaces are provided in each case in this variant by a front surface grinding data set for grinding the respective front spectacle lens surface. Additionally or alternatively, the rear spectacle lens surfaces from the number of different specified atoric rear spectacle lens surfaces are provided in each case by a rear surface grinding data set for grinding the respective rear spectacle lens surface. The grinding makes it possible to produce a spectacle lens according to the disclosure.

It is also possible to combine both variants and to form one of the spectacle lens surfaces by casting, whereas the other spectacle lens surface is shaped by grinding.

BRIEF DESCRIPTION OF THE DRAWINGS

The disclosure will now be described with reference to the drawings wherein.

DESCRIPTION OF EXEMPLARY EMBODIMENTS

The following definitions are used in the context of the present description:

Dioptric Power, Spherical Power and Astigmatic Power

Spectacle lenses have at least one dioptric power, the term "dioptric power" being a collective term for the focusing power and the prismatic power (DIN ISO 13666: 2013-10, subclause 10.9). The term "focusing power" is again a collective term for the spherical power, according to which a paraxial, parallel bundle of rays is focused on one point, and the astigmatic power of the spectacle lens, according to which a paraxial, parallel bundle of rays is focused on two mutually perpendicular lines. In the context of the present description, a bundle of rays should be considered to be a paraxial bundle of rays if its diameter does not exceed 0.05 mm, in particular 0.01 mm.

Prescription

The term "prescription" denotes a summary in which the dioptric powers necessary for correcting a diagnosed ametropia are specified in the form of suitable values. In the case of a spherical power, the prescription may contain a value "Sph" for sphere and, in the case of an astigmatic power, values "Zyl" for cylinder and "Ach" for axis. The prescription may also contain other values.

Prescription-Based Effect

In the context of the present description, the prescription-based effect indicates the desired effect of the spectacle lens when looking through the spectacle lens, in the case of the prescription-based spherical power, for example, the target value for the sphere when looking through the spectacle lens and, in the case of the prescription-based astigmatic power, the target values for the cylinder and axis when looking through the spectacle lens.

Principal Section

A principal section (DIN ISO 13666:2013-10, subclause 7.4) is that meridian plane of a surface with the maximum or minimum measured curvature of this surface, with the term "meridian plane" according to DIN ISO 13666:2013-10, subclause 5.7.1, denoting a plane containing the center or centers of curvature of a surface.

Aspherical Spectacle Lens

The term "aspherical spectacle lens" should be understood as meaning a spectacle lens with an aspherical surface, an aspherical surface being part of a surface of revolution of a variable curvature from the vertex to the periphery (DIN ISO 13666:2013-10, subclause 7.3). By contrast, a spherical surface is part of the inside or outside surface of a sphere (DIN ISO 13666:2013-10, subclause 7.1).

Atoric Spectacle Lens

The term "atoric spectacle lens" should be understood as meaning a spectacle lens with an atoric surface, an atoric surface being a surface which has two mutually perpendicular principal sections of differing curvature and of which the cross section in at least one of the principal sections is not circular (DIN ISO 13666:2013-10, subclause 7.6). By contrast, in the case of a toric surface, the cross sections in both principal sections is nominally circular (DIN ISO 13666: 2013-10, subclause 7.5). If in the case of an atoric surface the radii of curvature and the non-circular cross sections approximate to one another in both principal sections, in the limiting case of the same radii of curvature and the same non-circular cross sections in both principal sections an aspherical surface is obtained. In this sense, an aspherical surface represents a special form of the atoric surface and, within the scope of the present disclosure, should be included in the term atoric surface. A surface in which the radii of curvature differ from one another in the two principal sections and in which the cross section deviates from the circular shape in at least one of the principal sections is referred to in the context of the present description as a real atroic surface.

Family of Spectacle Lenses

In the context of the present description, a family of spectacle lenses should be understood as meaning a set of spectacle lenses which, on the one hand, are all characterized by the same parameter set and differ from one another by the parameter value of at least one parameter of the parameter set and, on the other hand, can all be produced using the same production method.

Vertex

The term "vertex" refers to the point of intersection of the optical axis with one of the two surfaces of a spectacle lens (DIN ISO 13666: 2013-10, subclause 4.9).

Corneal Vertex Distance

The term "corneal vertex distance" refers to the distance between the rear spectacle lens surface and the apex of the cornea, measured in the viewing direction perpendicular to the frame plane (DIN ISO 13666: 2013-10, subclause 5.27). The frame plane is the plane through the two vertical center lines of the right and left lens plane (DIN ISO 13666: 2013-10, subclause 17.2), the lens plane being a plane that is tangential to the front surface of a demo or dummy lens incorporated into the spectacle frame at the geometrical center of the lens.

Spherical Equivalent

The term "spherical equivalent" refers to a mean spherical power of a spectacle lens with a spherical power and an astigmatic power, the mean spherical power being based both on the spherical power and on the astigmatic power of the spectacle lens. The spherical equivalent is calculated according to the following equation: spherical equivalent=sphere+0.5×cylinder.

Center of Rotation of the Eye

The "center of rotation of the eye" refers to the fictitious point in the eye around which the eye rotates when the eye moves.

Figure 1:
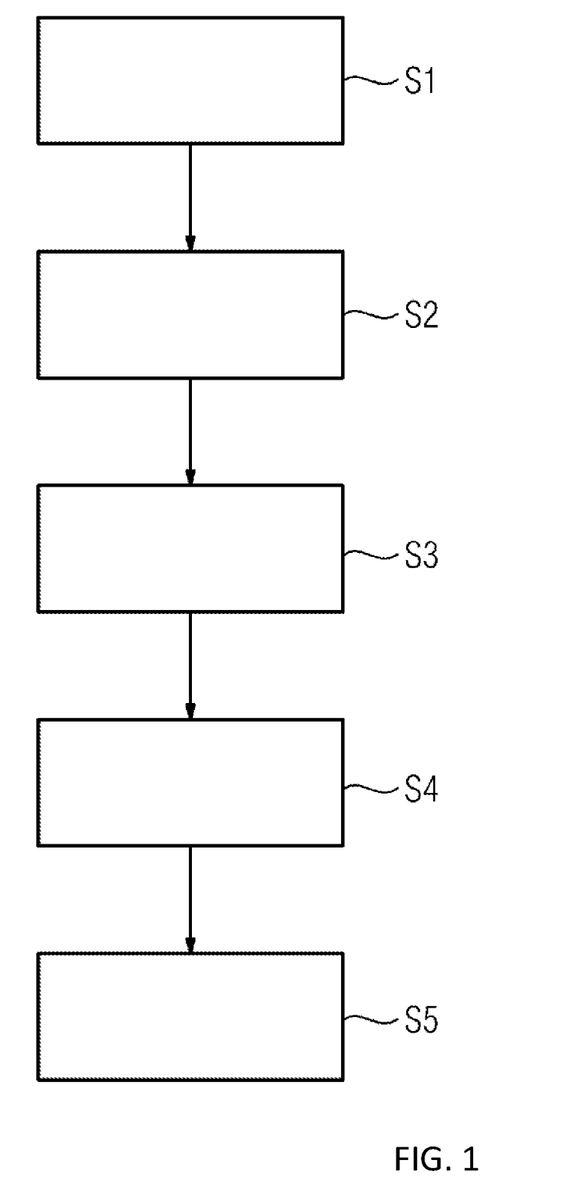
FIG. 1 shows by a flow diagram an example of designing a family of spectacle lenses.

An exemplary embodiment of the method according to the disclosure for designing a family of spectacle lenses is described below with reference to FIG. 1. The method is computer-implemented, i.e., it is performed on a computer. For this purpose, the method may be stored in the form of instructions on a computer-readable storage medium. The stored instructions cause a computer, on which they are executed, to perform the method shown in FIG. 1 for designing a family of spectacle lenses. The storage medium on which the instructions are stored may be any suitable non-volatile computer-readable storage medium. These comprise hard disk drives, solid-state disks (SSD), USB sticks, SD cards, storage spaces in a cloud, although this list, given by way of example, of computer-readable storage media is not exhaustive.

In the context of the present exemplary embodiment for the method for designing a family of spectacles, a number of prescription-based spherical powers and a number of prescription-based astigmatic powers are specified. The specification can either be provided externally, i.e., the number of prescription-based spherical powers and the number of prescription-based astigmatic powers is entered into the computer on which the method is performed. Alternatively, the number of prescription-based spherical powers and the number of prescription-based astigmatic powers may also be specified internally, i.e., the computer determines prescription-based spherical powers and suitable prescription-based astigmatic powers on the basis of specifications for these specifications. The specifications may be for example the lower end and the upper end of a range of prescription-based effects.

In the present exemplary embodiment, a number of prescription-based spherical powers for correcting distant ametropias and a number of prescription-based astigmatic powers for single-vision spectacle lenses are specified (step S1). In the next step of the method, in step S2, a spectacle lens with a rotationally symmetrical front spectacle lens surface and an atoric rear spectacle lens surface is determined in each case for each combination of a specific spherical power from the number of prescription-based spherical powers and a specific astigmatic power from the number of prescription-based astigmatic powers. In the present exemplary embodiment, the rotationally symmetrical front spectacle lens surface is an aspherical, rotationally symmetrical surface. The family of spectacle lenses is then provided by a number of combinations of aspherical, rotationally symmetrical front spectacle lens surfaces with atoric rear spectacle lens surfaces. In alternative embodiments of the method, purely spherical front spectacle lens surfaces may be used instead of the aspherical, rotationally symmetrical front spectacle lens surfaces. The family of spectacle lenses may in particular contain spectacle lenses for prescription-based values Zyl in the interval [0; −3 D] in 0.25 D steps and for prescription-based values for Sph in the interval [6 D; −8 D] in 0.25 D steps.

Each of the atoric rear spectacle lens surfaces has two principal sections. For each of the atoric rear surfaces, the deviation of the curvature from the circular shape in at least one principal section is determined for a value a of the distance between the vertex of the rear spectacle lens surface and the center of rotation of the eye, which is calculated according to the equation $a=HSA+(13.5-0.2 \cdot S_a)$, where HSA is the corneal vertex distance (Hornhaut-Scheitel-Abstand in German) and $S_a$ is the spherical equivalent, in each case in such a way that, with the determined value a for the distance between the vertex of the rear spectacle lens surface and the center of rotation of the eye, at every point of a region of the spectacle lens situated within a radius of 25 mm around the geometrical center of the spectacle lens an upper limit of the total deviation RMS=Sqrt $(sphAbw^2+(astAbw/2)^2)$ of the effect is not exceeded. In the equation for the total deviation, sphAbw stands for the deviation of the prescription-based spherical power of the spectacle lens from the spherical power actually achieved with it and astAbw stands for the deviation of the prescription-based astigmatic power of the spectacle lens from the astigmatic power actually achieved with it. If a value for sphAbw is less than zero, in the present exemplary embodiment this is set equal to zero in the equation RMS=Sqrt $(sphAbw^2+(astAbw/2)^2)$, because negative deviations of the prescription-based spherical power of the spectacle lens from the spherical power actually achieved with it can be accommodated by the spectacle wearer, and thus do not contribute to the image error of the spectacle lens, if they do not exceed a certain amount.

In the present exemplary embodiment, the upper limit of the total deviation is determined by the equation $$RMS \leq 0.18 \text{ D} - MIN[(0.045 \cdot Sph - 0.09 \cdot |Zyl|); 0],$$

where Sph denotes the "sphere" value of the prescription-based spherical power, Zyl denotes the "cylinder" value of the prescription-based astigmatic power, which in the present embodiment can assume a value from the interval [0 D, −3 D], and MIN denotes the minimum function. The following Table shows the value of the upper limit determined by the above equation, which is not exceeded by the total deviation RMS of the effect, as an example of the delivery range of a family of spectacle lenses with prescription-based spherical powers in the range from Sph=−8 D to Sph=+6 D and cylinder values of the prescription-based astigmatic power in the range from Zyl=0 D to Zyl=−3 D.

TABLE

| Sph\Zyl | 0 | −1 | −2 | −3 |
|---|---|---|---|---|
| −8 | 0.540 | | | |
| −7 | 0.495 | 0.585 | | |
| −6 | 0.450 | 0.540 | 0.630 | |
| −5 | 0.405 | 0.495 | 0.585 | 0.675 |
| −4 | 0.360 | 0.450 | 0.540 | 0.630 |
| −3 | 0.315 | 0.405 | 0.495 | 0.585 |
| −2 | 0.270 | 0.360 | 0.450 | 0.540 |
| −1 | 0.225 | 0.315 | 0.405 | 0.495 |
| 0 | 0.180 | 0.270 | 0.360 | 0.450 |
| 1 | 0.180 | 0.225 | 0.315 | 0.405 |
| 2 | 0.180 | 0.180 | 0.270 | 0.360 |
| 3 | 0.180 | 0.180 | 0.225 | 0.315 |
| 4 | 0.180 | 0.180 | 0.180 | 0.270 |
| 5 | 0.180 | 0.180 | 0.180 | 0.225 |
| 6 | 0.180 | 0.180 | 0.180 | 0.180 |

The Table shows that the total deviation RMS of the effect is low for every spectacle lens of the family of spectacle lenses, in particular also in the case of spectacle lenses with real atonic rear spectacle lens surfaces—and among these especially in the case of spectacle lenses with high prescription-based values for Zyl. With an aspherization of the front spectacle lens surface, as is known from the related art, the total deviation RMS of the effect of the spectacle lenses is higher than with the atoric rear spectacle lens surfaces according to the present disclosure, in particular in the case of high prescription-based values for Zyl. Nevertheless, no more mold shells than in the related art are required for the production of the spectacle lens family by molding.

In the present exemplary embodiment, a value of 12 mm is used for the corneal vertex distance HSA. In alternative embodiments, however, other values for the corneal vertex distance may also be used, for example values in the range between 10 mm and 15 mm. In principle, it is also possible to use different corneal vertex distances for the rotationally symmetrical front spectacle lens surface and the atoric rear spectacle lens surface.

With the values for Sph and Zyl given in the table, the value a of the distance between the vertex of the rear spectacle lens surface and the center of rotation of the eye, calculated according to the equation $a=HSA (13.5-0.2 \cdot S_a)$ for a corneal vertex distance of 12 mm, lies between 24.3 mm and 27.1 mm. If a value of 10 mm instead of 12 mm is used for the corneal vertex distance HSA, the calculated value a of the distance between the vertex of the rear spectacle lens surface and the center of rotation of the eye is between 22.3 mm and 25.1 mm and, if a value of 14 mm is used for the corneal vertex distance HSA, the calculated value a of the distance between the vertex of the rear spectacle lens surface and the center of rotation of the eye is between 26.3 mm and 29.1 mm. For other corneal vertex distances HSA, there are corresponding other ranges in which the value a of the distance between the vertex of the rear spectacle lens surface and the center of rotation of the eye lies.

In the next step of the method, in step S3, the determined aspherical, rotationally symmetrical front spectacle lens surfaces are divided into groups of aspherical, rotationally symmetrical front spectacle lens surfaces, the groups of aspherical, rotationally symmetrical front spectacle lens surfaces together containing a set of aspherical, rotationally symmetrical front spectacle lens surfaces differing from one another. Each group of aspherical, rotationally symmetrical front spectacle lens surfaces includes in each case a disjoint subset of the set of aspherical, rotationally symmetrical front spectacle lens surfaces. In the present exemplary embodiment, the groups of aspherical, rotationally symmetrical front spectacle lens surfaces comprise in each case four or five aspherical, rotationally symmetrical front spectacle lens surfaces which are respectively assigned to different prescription-based spherical powers of the spectacle lenses from the family of spectacle lenses. The number of front spectacle lens surfaces of a group is typically limited to four prescription-based spherical powers (that is to say for example from Sph=−1.25 D to Sph=−2.0 D), because the shrinkage is similar over such a range. Beyond the range of four prescription-based spherical powers, another correction factor must then be provided for the shrinkage. In the present exemplary embodiment, only that group which contains the prescription-based spherical power with Sph=0 contains front spectacle lens surfaces for five prescription-based spherical powers.

In addition, in step S3, the atoric rear spectacle lens surfaces are also divided into groups of atoric rear spectacle lens surfaces, the groups of atoric rear spectacle lens surfaces together forming a set of atoric rear spectacle lens surfaces. Each group of atoric rear spectacle lens surfaces includes a disjoint subset of the set of atoric rear spectacle lens surfaces. In the present exemplary embodiment, each group of atoric rear spectacle lens surfaces 13 contains atoric rear surfaces which are respectively assigned to different prescription-based astigmatic powers of the spectacle lenses from the family of spectacle lenses.

In step S4, the groups of atoric rear spectacle lens surfaces are then assigned to the groups of prescription-based aspherical, rotationally symmetrical front spectacle lens surfaces. In the present exemplary embodiment, each group of atoric rear spectacle lens surfaces is assigned to precisely one group of aspherical, rotationally symmetrical front spectacle lens surfaces.

In step S5, the family of spectacle lenses is then made available in the form of the groups of aspherical, rotationally symmetrical front spectacle lens surfaces, the groups of atoric rear spectacle lens surfaces and the assignment of the groups of atoric rear spectacle lens surfaces to the groups of aspherical, rotationally symmetrical front spectacle lens surfaces.

Figure 2:
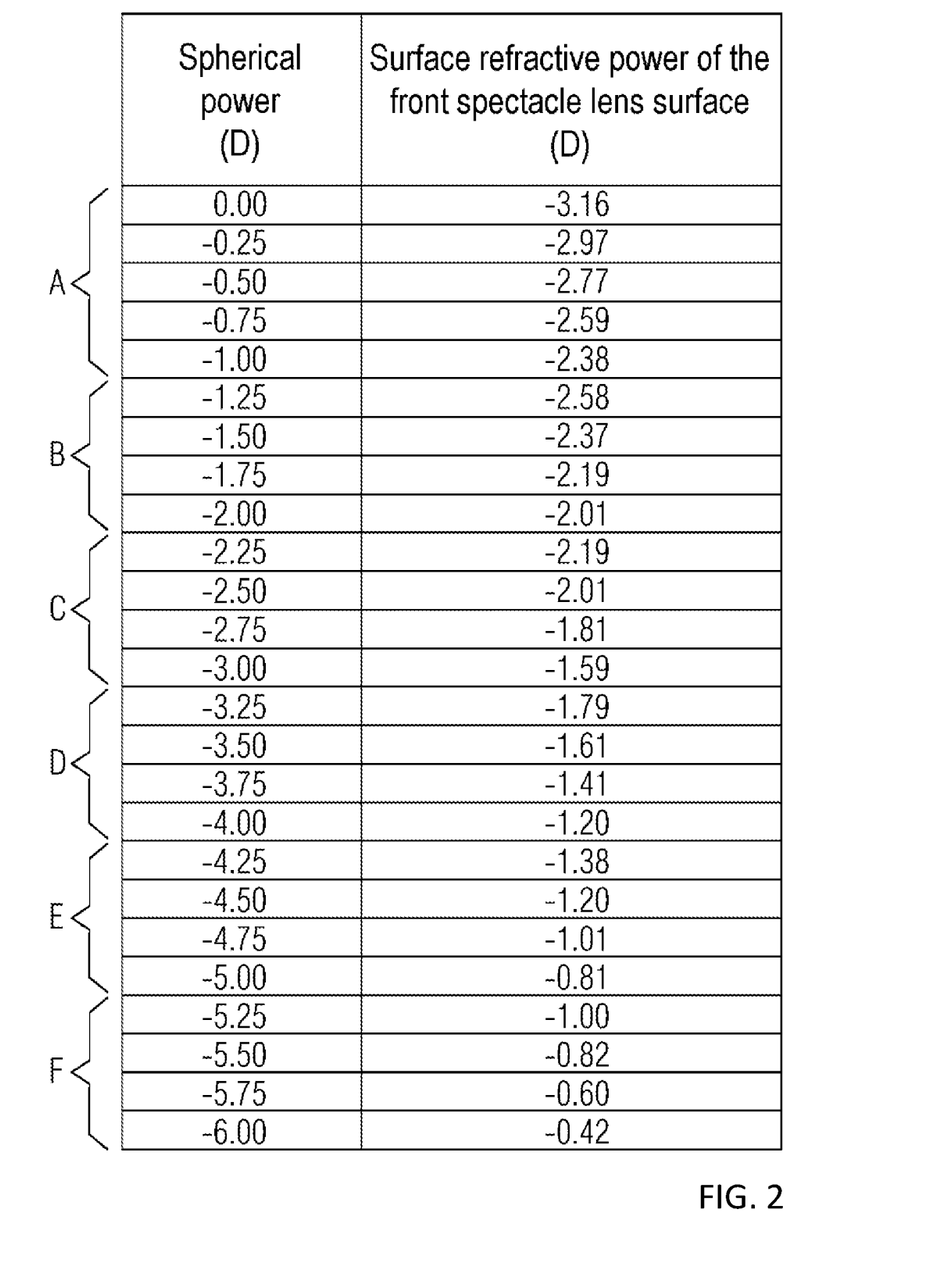
FIG. 2 shows the surface refractive power of the front surfaces of the spectacle lenses of a family of spectacle lenses for a range of spherical powers of the spectacle lenses.
Figure 3:
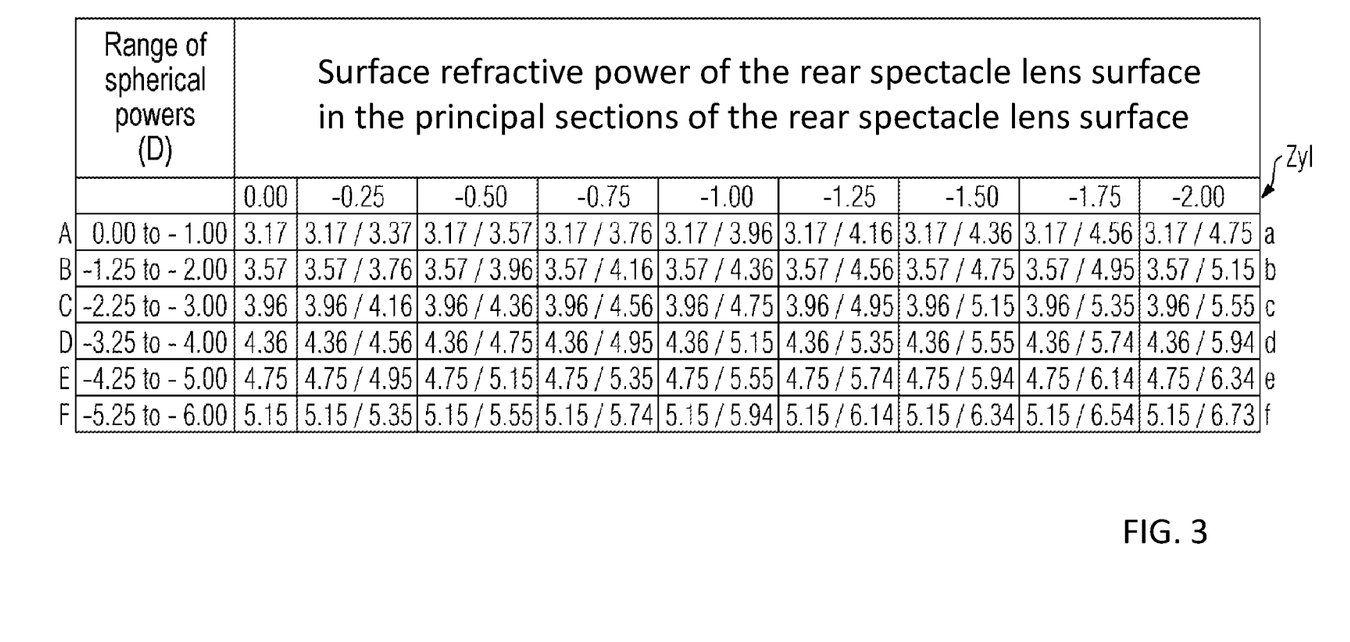
FIG. 3 shows for the family of spectacle lenses from FIG. 2 the surface refractive powers of the rear spectacle lens surfaces in the principal sections.

An example of a family of spectacle lenses made from a glass with a refractive index of 1.67, designed according to the exemplary embodiment described, is given in FIGS. 2 and 3. FIG. 2 shows six groups A to F of aspherical, rotationally symmetrical front spectacle lens surfaces, each group of aspherical, rotationally symmetrical front spectacle lens surfaces except for group A representing a range of prescription-based spherical powers of the spectacle lenses of one diopter in 0.25 diopter steps. Only group A represents a greater range of altogether one diopter, since this group contains the lens with the prescription-based spherical power 0. For each front surface, in addition to the prescription-based spherical power of the lens for which it is used, the surface refractive power of the front spectacle lens surface in the geometric center of the spectacle lens, based on a refractive index of 1.53, is also indicated in FIG. 2. FIG. 2 shows by way of example the range of Sph [0; −6 D] and Zyl [0; −2 D], for which casting takes place with mold shells with a diameter of 80 mm. In contrast, with positive values for the prescription-based spherical power and with more negative values for the prescription-based spherical power, i.e., in the present exemplary embodiment with prescription-based spherical powers with values in the intervals [6 D, 0 D] or [−8 D, −6 D], mold shells with smaller diameters are typically used. Since the following explanations apply in an analogous manner to prescription-based spherical powers with values in the intervals [6 D, 0 D] or [−8 D, −6 D], these intervals are not shown in FIGS. 2 and 3.

FIG. 3 shows in the left column the ranges of the prescription-based spherical powers of the respective groups A to F of aspherical, rotationally symmetrical front spectacle lens surfaces. The other columns show the surface refractive powers of the rear spectacle lens surfaces of the respective atoric rear spectacle lens surfaces in the geometrical center of the spectacle lens, which are assigned to the individual groups A to F of aspherical, rotationally symmetrical front spectacle lens surfaces, depending on the prescription-based value "Zyl", that is to say the cylinder value of the prescription-based astigmatic power. Each group of aspherical, rotationally symmetrical front spectacle lens surfaces A to F is assigned a group of atoric rear spectacle lens surfaces a to f. In the present exemplary embodiment, all of the groups of atoric rear spectacle lens surfaces a to f comprise in each case 13 different rear spectacle lens surfaces, of which only nine are shown in FIG. 3 (specifically those for prescription-based cylinder values in the interval [0 D, −2 D]) in order to be able to make the table more compact. The represented prescription-based cylinder values thus show a extract from the prescription-based cylinder values of the exemplary embodiment, the extract covering the range of cylinder values from 0 to −2 diopters in 0.25 diopter steps. Every atoric rear surface of a group of atoric rear surfaces a to f has in each case the same refractive power in a principal section, whereas it has different surface refractive powers in the principal section perpendicular thereto. The refractive powers given in the table respectively relate to the surface refractive powers in the geometrical center of the spectacle lens and a refractive index of 1.53. In the first group of atoric rear surfaces, the surface refractive power in the first principal section has the value 3.17 diopters, whereas the surface refractive power in the other principal section varies between 3.17 diopters and 4.75 diopters. It should be noted at this point that, in the event that the same surface refractive power is present in both principal sections, an aspherical surface is present instead of an atoric surface. This case corresponds to the cylinder value 0.00. In the column for the cylinder value 0.00 there is therefore only a single surface refractive power, which is present in both principal sections of the rear spectacle lens surface.

As can be seen in FIG. 3, each group of atoric rear surfaces a to f is assigned to a group A to F of aspherical, rotationally symmetrical front spectacle lens surfaces, it being possible for each atoric rear spectacle lens surface of a group a to f of atoric rear spectacle lens surfaces to be combined with each aspherical, rotationally symmetrical front spectacle lens surface of a group A to F of rotationally symmetrical aspherical front spectacle lens surfaces to represent a spectacle lens of the family of spectacle lenses. Due to the grouping of the front spectacle lens surfaces and the rear spectacle lens surfaces and the fact that the spectacle lens surfaces from groups assigned to one another can be freely combined, the number of front spectacle lens surfaces and rear spectacle lens surfaces to be kept in stock is limited to a necessary minimum.

Figure 4:
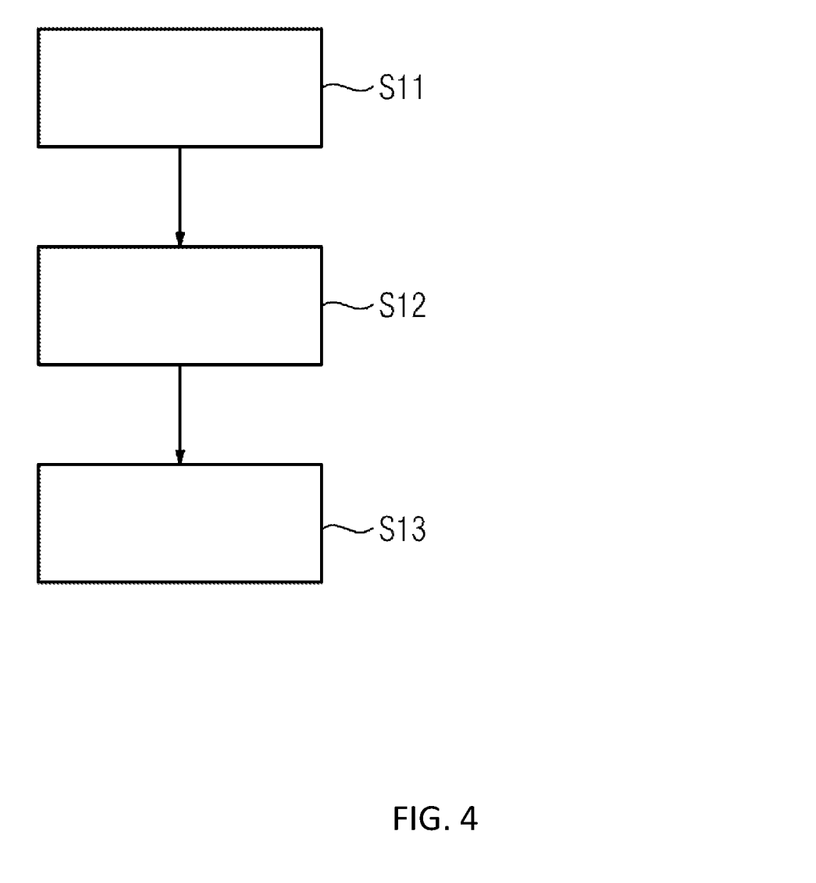
FIG. 4 shows in a flow diagram an exemplary embodiment for the production of a spectacle lens of the family of spectacle lenses.

The production of a spectacle lens of the family of spectacle lenses shown in extract form in FIGS. 2 and 3 is described below using an exemplary embodiment with reference to FIG. 4. In a first step S11 of the method, a prescription-based spherical power and a prescription-based astigmatic power are specified. Either the prescription-based spherical power or the prescription-based astigmatic power can also have the value zero. For the combination of the specified prescription-based spherical power and the specified prescription-based astigmatic power, an aspherical, rotationally symmetrical front spectacle lens surface is then selected in step S12 from that group of front spectacle lens surfaces which contains the prescription-based spherical power. If the prescription-based spherical power lies for example in the interval [0 D, −6 D], the aspherical, rotationally symmetrical front spectacle lens surface is selected from that group A to F of front spectacle lens surfaces which contains the prescription-based spherical power. In addition, in step S12 an atonic rear spectacle lens surface is selected. The atoric rear spectacle lens surface is selected from the group of rear spectacle lens surfaces which is assigned to the group of front spectacle lens surfaces in which the selected aspherical, rotationally symmetrical front spectacle lens surface is located. If the prescription-based spherical power lies in the interval [0 D, −6 D], the atoric rear spectacle lens surface is thus selected from one of the groups a to f of rear spectacle lens surfaces, specifically from that group which is assigned to group A to F of front spectacle lens surfaces in which the selected aspherical, rotationally symmetrical front spectacle lens surface is located. For example in the case of a prescription-based spherical power of −2.5 D, the associated front spectacle lens surface is in group C, so that the atoric rear spectacle lens surface for the prescription-based astigmatic power is selected from group c. The selection of the front spectacle lens surface and the rear spectacle lens surface takes place in an automated manner on the basis of the prescription-based spherical power and the prescription-based astigmatic power that the spectacle lens is intended to provide. In step S13, a spectacle lens which has the selected aspherical, rotationally symmetrical front spectacle lens surface and the selected atoric rear spectacle lens surface is then produced.

In a first variant of the present exemplary embodiment for producing a spectacle lens, the spectacle lens is produced by casting with an organic glass material. In this case, the front spectacle lens surfaces and the rear spectacle lens surfaces are in the form of front surface mold shells and rear surface molded shells. Each front surface mold shell has a shaping surface for the shape surfacing of one of the aspherical, rotationally symmetrical front spectacle lens surfaces. Correspondingly, each rear surface mold shell has a shaping surface for the shaping of one of the atoric rear spectacle lens surfaces. The selection of the front spectacle lens surface from the number of different specified aspherical, rotationally symmetrical front spectacle lens surfaces therefore takes place in this variant by selecting the corresponding front surface mold shell. The selection of the atoric rear spectacle lens surface takes place by selecting the corresponding rear surface mold shell. With the aid of the selected front surface mold shell and the selected rear surface mold shell, the spectacle lens can then be cast, for example with the aid of the organic glass material.

In a second variant, the spectacle lens is produced on the basis of the selected aspherical, rotationally symmetrical front spectacle lens surface and the basis of the atoric rear spectacle lens surface, not by casting, but by grinding a glass body. This method is suitable in particular in the case of inorganic glass materials that could not be cast, or only with very great effort. If the spectacle lens is produced by grinding, the aspherical, rotationally symmetrical front spectacle lens surfaces are provided in each case by a front surface data set for grinding the corresponding front spectacle lens surface. The atoric rear spectacle lens surfaces are then provided by a rear surface grinding data set for grinding the respective rear spectacle lens surface.

The present disclosure has been described in detail on the basis of exemplary embodiments for explanatory purposes. However, a person skilled in the art recognizes that he can deviate from these exemplary embodiments. In particular, there is for example the possibility that, instead of the stricter equation as in the present exemplary embodiment $$RMS \leq 0.18 \ D\text{-MIN}[(0.045 \cdot Sph - 0.09 \cdot |Zyl|); 0],$$

the less strict equation $$RMS \leq 0.25 \ D\text{-MIN}[(0.05 \cdot Sph - 0.1 \cdot |Zyl|); 0]$$

is used if somewhat greater image errors of the spectacle lenses can be accepted. A person skilled in the art also recognizes that further deviations from the exemplary embodiments are possible without deviating from the disclosure as it is defined in the appended claims.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-implemented method for designing a family of spectacle lenses, the method comprising:
    specifying a number of prescription-based spherical powers and a number of prescription-based astigmatic powers;
    determining, for each combination of a specific spherical power from the number of prescription-based spherical powers with a specific astigmatic power from the number of prescription-based astigmatic powers, in each case a spectacle lens with a rotationally symmetrical front spectacle lens surface and an atoric rear spectacle lens surface;
    forming groups of rotationally symmetrical front spectacle lens surfaces such that each group of rotationally symmetrical front spectacle lens surfaces contains a number of different rotationally symmetrical front spectacle lens surfaces;
    forming groups of atoric rear spectacle lens surfaces such that each group of atoric rear spectacle lens surfaces contains a number of atoric rear spectacle lens surfaces;

assigning each group of atoric rear spectacle lens surfaces to a group of rotationally symmetrical front spectacle lens surfaces; and assigning each combination of an atoric rear spectacle lens surface from a group of atoric rear spectacle lens surfaces with a rotationally symmetrical front spectacle lens surface from the assigned groups of rotationally symmetrical front spectacle lens surfaces to a spectacle lens of the family of spectacle lenses, wherein each of the atoric rear spectacle lens surfaces has in at least one principal section a deviation of a curvature from a circular shape, such that, with a value for a distance a between a vertex of the real atoric rear spectacle lens surface and a center of rotation of the eye, which is obtained from the equation $a=HSA+(13.5-0.2\cdot S_a)$, wherein HSA is a corneal vertex distance and $S_a$ is a spherical equivalent, at every point of a region of the spectacle lens situated within a radius of 25 mm around a geometrical center of the spectacle lens an upper limit of a total deviation $RMS=Sqrt\ (SphAbw^2+(astAbw/2)^2)$ of a prescription-based effect is not exceeded, wherein an upper limit of the total deviation is given by $$0.25\ D-MIN[(0.05\cdot Sph-0.1\cdot|Zyl|);0],\ \text{and}$$

wherein

Sph denotes a sphere value of the prescription-based spherical power,

Zyl denotes a cylinder value of the prescription-based astigmatic power, which can assume a value of zero or a negative value, $|Zyl|$ denotes an absolute value of the cylinder value, sphAbw denotes a deviation of the prescription-based spherical power of the spectacle lens from the spherical power actually achieved with the spectacle lens, astAbw denotes the deviation of the prescription-based astigmatic power of the spectacle lens from the astigmatic power actually achieved with the spectacle lens, and MIN denotes a minimum function.

2. The computer-implemented method as claimed in claim 1, wherein values for sphAbw that are less than zero are set equal to zero in the equation $$RMS=Sqrt(SphAbw^2+(astAbw/2)^2).$$

3. The computer-implemented method as claimed in claim 1, wherein the upper limit of the total deviation is given by $$RMS\leq 0.18\ D-MIN[(0.045\cdot Sph-0.09\cdot|Zyl|);0].$$

4. A non-volatile computer-readable storage medium with instructions stored thereon for designing a family of spectacle lenses, the instructions, when executed on a computer, causing the computer to:

specify or record a number of prescription-based spherical powers and a number of prescription-based astigmatic powers; and determine for each from the combination of a specific spherical power from the number of prescription-based spherical powers with a specific astigmatic power from the number of prescription-based astigmatic powers in each case a spectacle lens with a rotationally symmetrical front spectacle lens surface and an atoric rear spectacle lens surface;

form groups of rotationally symmetrical front spectacle lens surfaces such that each group of rotationally symmetrical front spectacle lens surfaces contains a number of different rotationally symmetrical front spectacle lens surfaces, wherein the non-volatile computer-readable storage medium also comprises instructions stored thereon, which, when executed on the computer, cause the computer to:

form groups of atoric rear spectacle lens surfaces such that each group of atoric rear spectacle lens surfaces contains a number of atoric rear spectacle lens surfaces;

assign each group of atoric rear spectacle lens surfaces to a group of rotationally symmetrical front spectacle lens surfaces; and assign each combination of an atoric rear spectacle lens surface from a group of atoric rear spectacle lens surfaces with a rotationally symmetrical front spectacle lens surface from the assigned groups of rotationally symmetrical front spectacle lens surfaces to a spectacle lens of the family of spectacle lenses, wherein to determine for each of the atoric rear spectacle lens surfaces the deviation of a curvature of the respective atoric rear spectacle lens surface from the circular shape in at least one principal section for a value for a distance a between a vertex of the rear spectacle lens surface and a center of rotation of the eye, which is obtained from the equation $a=HSA+(13.5-0.2\cdot S_a)$, where HSA is the corneal vertex distance and $S_a$ is the spherical equivalent, such that, with a distance between the vertex of the rear spectacle lens surface and the center of rotation of the eye corresponding to the value, at every point of a region of the spectacle lens situated within a radius of 25 mm around a geometrical center of the spectacle lens an upper limit of a total deviation $$RMS=Sqrt(SphAbw^2+(astAbw/2)^2)$$

of the prescription-based effect is not exceeded, wherein an upper limit of the total deviation is given by $$0.25\ D-MIN[(0.05\cdot Sph-0.1\cdot|Zyl|);0],\ \text{and}$$

wherein

Sph denotes the sphere value of the prescription-based spherical power,

Zyl denotes the cylinder" value of the prescription-based astigmatic power, which can assume the value zero or a negative value, $|Zyl|$ denotes the absolute value of the cylinder value, sphAbw denotes the deviation of the prescription-based spherical power of the spectacle lens from the spherical power actually achieved with the spectacle lens, astAbw denotes the deviation of the prescription-based astigmatic power of the spectacle lens from the astigmatic power actually achieved with the spectacle lens, and MIN denotes the minimum function.

5. The non-volatile computer-readable storage medium as claimed in claim 4, wherein values for sphAbw that are less than zero are set equal to zero in the equation $$RMS=Sqrt(SphAbw^2+(astAbw/2)^2).$$

6. The non-volatile computer-readable storage medium as claimed in claim 4, wherein the upper limit of the total deviation is given by $$RMS\leq 0.18\ D-MIN[(0.045\cdot Sph-0.09\cdot|Zyl|);0].$$

7. A method for producing a spectacle lens having:
a rotationally symmetrical front spectacle lens surface; and a real atoric rear spectacle lens surface,
wherein the real atonic rear spectacle lens surface has in at least one principal section a deviation of a curvature from a circular shape,
such that, with a value for a distance a between a vertex of the real atoric rear spectacle lens surface and a center of rotation of the eye, which is obtained from the equation $a=HSA+(13.5-0.2 \cdot S_a)$, wherein HSA is a corneal vertex distance and $S_a$ is a spherical equivalent, at every point of a region of the spectacle lens situated within a radius of 25 mm around a geometrical center of the spectacle lens an upper limit of a total deviation RMS=Sqrt (SphAbw$^2$+ (astAbw/2)$^2$) of a prescription-based effect is not exceeded,
wherein an upper limit of the total deviation is given by 0.25 D–MIN[(0.05·$Sph$–0.1·|$Zyl$|);0], and wherein
Sph denotes a sphere value of the prescription-based spherical power,
Zyl denotes a cylinder value of the prescription-based astigmatic power, which can assume a value of zero or a negative value,
|Zyl|denotes an absolute value of the cylinder value,
sphAbw denotes a deviation of the prescription-based spherical power of the spectacle lens from the spherical power actually achieved with the spectacle lens,
astAbw denotes the deviation of the prescription-based astigmatic power of the spectacle lens from the astigmatic power actually achieved with the spectacle lens, and
MIN denotes a minimum function, the method comprising:
specifying a prescription-based spherical power and a prescription-based astigmatic power;
selecting, for the combination of the specified prescription-based spherical power and the specified prescription-based astigmatic power, a rotationally symmetrical front spectacle lens surface from a group of a number of groups of rotationally symmetrical front spectacle lens surfaces of a family of spectacle lenses and an atoric rear spectacle lens surface from a group of a number of groups of atoric rear spectacle lens surfaces of the family of spectacle lenses, the family of spectacle lenses having been designed according to a computer-implemented method including:
determining, for each combination of a specific spherical power from the number of prescription-based spherical powers with a specific astigmatic power from the number of prescription-based astigmatic powers, in each case a spectacle lens with a rotationally symmetrical front spectacle lens surface and an atoric rear spectacle lens surface;
forming groups of rotationally symmetrical front spectacle lens surfaces such that each group of rotationally symmetrical front spectacle lens surfaces contains a number of different rotationally symmetrical front spectacle lens surfaces;
forming groups of atoric rear spectacle lens surfaces such that each group of atoric rear spectacle lens surfaces contains a number of atoric rear spectacle lens surfaces;
assigning each group of atoric rear spectacle lens surfaces to a group of rotationally symmetrical front spectacle lens surfaces; and
assigning each combination of an atoric rear spectacle lens surface from a group of atoric rear spectacle lens surfaces with a rotationally symmetrical front spectacle lens surface from the assigned groups of rotationally symmetrical front spectacle lens surfaces to a spectacle lens of the family of spectacle lenses,
wherein the front spectacle lens surface is selected from that group of front spectacle lens surfaces which contains the prescription-based spherical power and the atoric rear spectacle lens surface is selected from the group of rear spectacle lens surfaces which is assigned to the group of front spectacle lens surfaces in which the selected aspherical, rotationally symmetrical front spectacle lens surface is located.

8. The method as claimed in claim 7, wherein values for sphAbw that are less than zero are set equal to zero in the equation RMS=Sqrt (SphAbw$^2$+(astAbw/2)$^2$).

9. The method as claimed in claim 7, further comprising:
forming at least one of the spectacle lens surfaces by casting,
wherein at least one of:
the front spectacle lens surfaces from the groups of front spectacle lens surfaces are provided in each case by a front surface mold shell with a shaping surface for shaping the respective front spectacle lens surface, or
the rear spectacle lens surfaces from the groups of rear spectacle lens surfaces are provided in each case by a rear surface mold shell with a shaping surface for shaping the respective rear spectacle lens surface.

10. The method as claimed in claim 7, further comprising:
shaping at least one of the spectacle lens surfaces by grinding,
wherein at least one of:
the front spectacle lens surfaces of the groups of front spectacle lens surfaces are provided in each case by a front surface grinding data set for grinding the respective front spectacle lens surface, or
the rear spectacle lens surfaces from the groups of rear spectacle lens surfaces are provided in each case by a rear surface grinding data set for grinding the respective rear spectacle lens surface.

11. The method as claimed in claim 7, wherein the upper limit of the total deviation is given by RMS≤0.18 D–MIN[(0.045·$Sph$–0.09·|$Zyl$|);0].

12. A computer-implemented method for designing a family of spectacle lenses, the method comprising:
specifying a number of prescription-based spherical powers and a number of prescription-based astigmatic powers; and
determining, for each combination of a specific spherical power from the number of prescription-based spherical powers with a specific astigmatic power from the number of prescription-based astigmatic powers, in each case a spectacle lens with a rotationally symmetrical front spectacle lens surface and an atoric rear spectacle lens;
forming groups of rotationally symmetrical front spectacle lens surfaces such that each group of rotationally symmetrical front spectacle lens surfaces contains a number of different rotationally symmetrical front spectacle lens surfaces;
forming groups of atoric rear spectacle lens surfaces such that each group of atoric rear spectacle lens surfaces contains a number of atoric rear spectacle lens surfaces;

assigning each group of atoric rear spectacle lens surfaces to a group of rotationally symmetrical front spectacle lens surfaces; and assigning each combination of an atoric rear spectacle lens surface from a group of atoric rear spectacle lens surfaces with a rotationally symmetrical front spectacle lens surface from the assigned groups of rotationally symmetrical front spectacle lens surfaces to a spectacle lens of the family of spectacle lenses, wherein for each of the atoric rear spectacle lens surfaces, a deviation of a curvature of the respective atoric rear spectacle lens surface from the circular shape in at least one principal section is determined for a value for the distance a between a vertex of the rear spectacle lens surface and the center of rotation of the eye that lies in a range between 15 and 40 mm such that at every point of a region of the spectacle lens situated within a radius of 25 mm around a geometrical center of the spectacle lens an upper limit of the total deviation RMS=Sqrt (SphAbw$^2$+(astAbw/2)$^2$) of the prescription-based effect is not exceeded, wherein an upper limit of the total deviation is given by $$0.25\ D-\text{MIN}[(0.05 \cdot Sph - 0.1 \cdot |Zyl|); 0],\ \text{and}$$

wherein

Sph denotes a sphere value of the prescription-based spherical power,

Zyl denotes a cylinder value of the prescription-based astigmatic power, which can assume a value of zero or a negative value,

|Zyl| denotes an absolute value of the cylinder value, sphAbw denotes a deviation of the prescription-based spherical power of the spectacle lens from the spherical power actually achieved with the spectacle lens, astAbw denotes the deviation of the prescription-based astigmatic power of the spectacle lens from the astigmatic power actually achieved with the spectacle lens, and MIN denotes a minimum function.

13. A non-volatile computer-readable storage medium with instructions stored thereon for designing a family of spectacle lenses, the instructions, when executed on a computer, causing the computer to:

specify or record a number of prescription-based spherical powers and a number of prescription-based astigmatic powers; and determine for each from the combination of a specific spherical power from the number of prescription-based spherical powers with a specific astigmatic power from the number of prescription-based astigmatic powers in each case a spectacle lens with a rotationally symmetrical front spectacle lens surface and an atoric rear spectacle lens surface, wherein the non-volatile computer-readable storage medium also comprises instructions stored thereon, which, when executed on the computer, cause the computer to:

form groups of rotationally symmetrical front spectacle lens surfaces in such a way that each group of rotationally symmetrical front spectacle lens surfaces contains a number of different rotationally symmetrical front spectacle lens surfaces;

form groups of atoric rear spectacle lens surfaces in such a way that each group of atoric rear spectacle lens surfaces contains a number of atoric rear spectacle lens surfaces;

assign each group of atoric rear spectacle lens surfaces to a group of rotationally symmetrical front spectacle lens surfaces; and assign each combination of an atoric rear spectacle lens surface from a group of atoric rear spectacle lens surfaces with a rotationally symmetrical front spectacle lens surface from the assigned groups of rotationally symmetrical front spectacle lens surfaces to a spectacle lens of the family of spectacle lenses, wherein to determine for each of the atoric rear spectacle lens surfaces the deviation of the curvature of the respective atoric rear spectacle lens surface from the circular shape in at least one principal section for a value for the distance between the vertex of the rear spectacle lens surface and the center of rotation of the eye that lies in a range between 15 and 40 mm in such a way that in such a way that, with a distance between the vertex of the rear spectacle lens surface and the center of rotation of the eye corresponding to the value, at every point of a region of the spectacle lens situated within a radius of 25 mm around the geometrical center of the spectacle lens an upper limit of the total deviation RMS=Sqrt (SphAbw$^2$+(astAbw/2)$^2$) of the prescription-based effect is not exceeded, wherein an upper limit of the total deviation is given by $$0.25\ D-\text{MIN}[(0.05 \cdot Sph - 0.1 \cdot |Zyl|); 0],\ \text{and}$$

wherein

Sph denotes a sphere value of the prescription-based spherical power,

Zyl denotes a cylinder value of the prescription-based astigmatic power, which can assume a value of zero or a negative value,

|Zyl| denotes an absolute value of the cylinder value, sphAbw denotes a deviation of the prescription-based spherical power of the spectacle lens from the spherical power actually achieved with the spectacle lens, astAbw denotes the deviation of the prescription-based astigmatic power of the spectacle lens from the astigmatic power actually achieved with the spectacle lens, and MIN denotes a minimum function.

* * * * *

UNITED STATES PATENT AND TRADEMARK OFFICE
CERTIFICATE OF CORRECTION

PATENT NO. : 11,199,726 B2
APPLICATION NO. : 17/319385
DATED : December 14, 2021
INVENTOR(S) : Markus Welscher Page 1 of 1

It is certified that error appears in the above-identified patent and that said Letters Patent is hereby corrected as shown below:

In the Specification
Column 11, Line 58, change "tonic" to -- toric --.
Column 13, Line 36, change "(13.5-0.2·Sa)" to -- (13.5-0.2·Sä) --.
Column 13, Line 38, change "and·Sa" to -- and·Sä --.
Column 14, Line 30, change "atonic" to -- atoric --.
Column 17, Line 19, change "atonic" to -- atoric --.

In the Claims
Column 19, Line 16, Claim 1, change "(13.5-0.2·Sa)" to -- (13.5-0.2·Sä) --.
Column 19, Line 17, Claim 1, change "and·Sa" to -- and·Sä --.
Column 20, Line 26, Claim 4, change "(13.5-0.2·Sa)" to -- (13.5-0.2·Sä) --.
Column 20, Line 27, Claim 4, change "and·Sa" to -- and·Sä --.
Column 21, Line 2, Claim 7, change "atonic" to -- atoric --.
Column 21, Line 8, Claim 7, change "(13.5-0.2·Sa)" to -- (13.5-0.2·Sä) --.
Column 21, Line 9, Claim 7, change "and·Sa" to -- and·Sä --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*